United States Patent
Chi

Patent Number: 5,163,758
Date of Patent: Nov. 17, 1992

[54] JOURNAL FOR A HEAD TUBE OF A BICYCLE

[76] Inventor: Yi-Chen Chi, No. 139-5, An Mei Rd., Mei Shan Village, Hou Li Hsiang, Taichung Hsien, Taiwan

[21] Appl. No.: 707,377

[22] Filed: May 30, 1991

[51] Int. Cl.⁵ ............................................. B62K 21/18
[52] U.S. Cl. ................................ 384/540; 280/279; 384/545
[58] Field of Search ............... 384/490, 504, 513, 517, 384/540, 544, 545; 280/279, 280, 276; 74/551.1–551.3

[56] References Cited

U.S. PATENT DOCUMENTS

| | | | |
|---|---|---|---|
| 1,850,348 | 3/1932 | Harley | 280/279 |
| 3,306,684 | 2/1967 | Klein, Jr. | 384/475 |
| 3,438,650 | 4/1969 | Jaulmes | 384/545 X |
| 4,341,394 | 7/1982 | Cabeza | 280/279 |
| 4,466,629 | 8/1984 | Sinyard | 384/489 X |
| 4,531,756 | 7/1985 | Mori | 384/517 X |
| 4,934,839 | 6/1990 | Chi | 384/477 |

*Primary Examiner*—Thomas R. Hannon
*Attorney, Agent, or Firm*—Townsend and Townsend

[57] ABSTRACT

A journal including a lower cap engaged on an end portion of a head tube of a bicycle, the lower cap having an annular recess, a bearing engaged in the annular recess of the lower cap, an upper cap threadedly engaged on the upper portion of the front fork and engaged on the bearing so that the front fork is rotatable relative to the head tube, and a compression nut threadedly engaged above the upper cap so that the upper cap can be stably retained in place.

5 Claims, 3 Drawing Sheets

JOURNAL FOR A HEAD TUBE OF A BICYCLE

BACKGROUND OF THE INVENTION

1. Field of the Invention

The present invention relates to a journal, and more particularly to a journal for a head tube of a bicycle.

2. Description of the Prior Art

The closest prior art of which the applicant is aware is his prior U.S. Pat. No. 4,934,839 to Chi, filed Jun. 28, 1989, entitled "JOURNAL FOR A FRAME FORK OF A BICYCLE". This journal is generally disposed on the lower end portion of the head tube of a bicycle.

The present invention has arisen to provide a novel journal for a head tube of a bicycle.

SUMMARY OF THE INVENTION

The primary objective of the present invention is to provide a novel journal for a head tube of a bicycle which is generally disposed on the upper end portion of the head tube of a bicycle.

In accordance with one aspect of the invention, there is provided a journal which includes a first cap engaged on an end portion of a head tube of a bicycle, the bicycle including a front fork having an upper portion rotatably engaged in the head tube, the first cap having an annular recess formed therein, a bearing engaged in the annular recess of the first cap, a second cap threadedly engaged on the upper portion of the front fork and engaged on the bearing so that the second cap and the front fork are rotatable relative to the first cap and the head tube, and a compression nut threadedly engaged on the upper portion of the front fork and engaged above the second cap so that the second cap can be stably retained in place.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
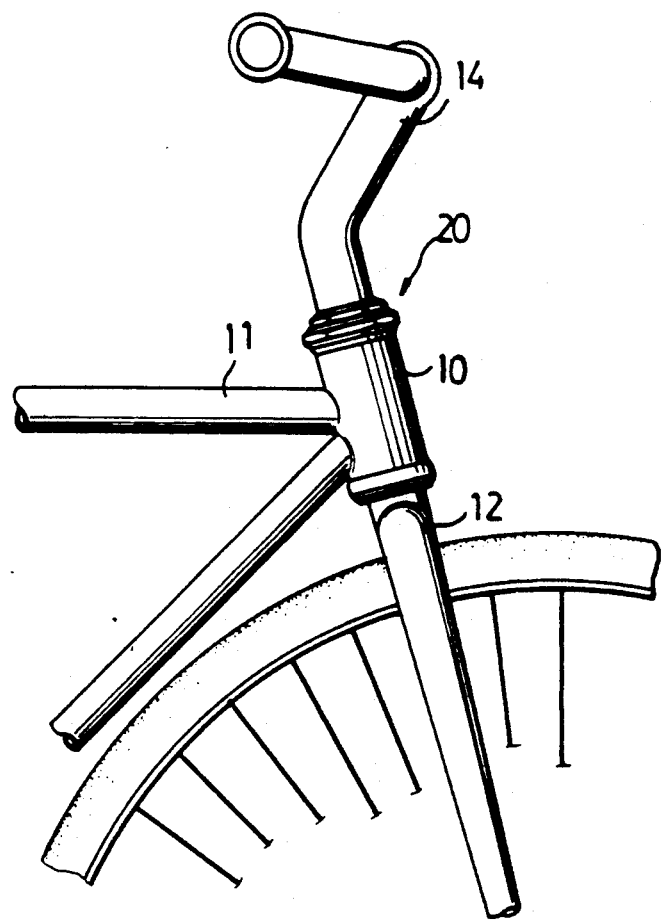
FIG. 1 is a plane view showing the front portion of a bicycle.

Referring to the drawings and initially to FIG. 1, a journal 20 in accordance with the present invention is generally disposed on the upper end portion of a head tube 10 of a bicycle, the frame 11 of the bicycle is generally fixed to the head tube 10, the upper portion of the front fork 12 is rotatably engaged in the head tube 10, and the lower end portion of the handlebar stem 14 is engaged in the front fork 12. Similarly, the journal 20 is also suitable for being disposed on the lower portion of the head tube 10.

Figure 2:
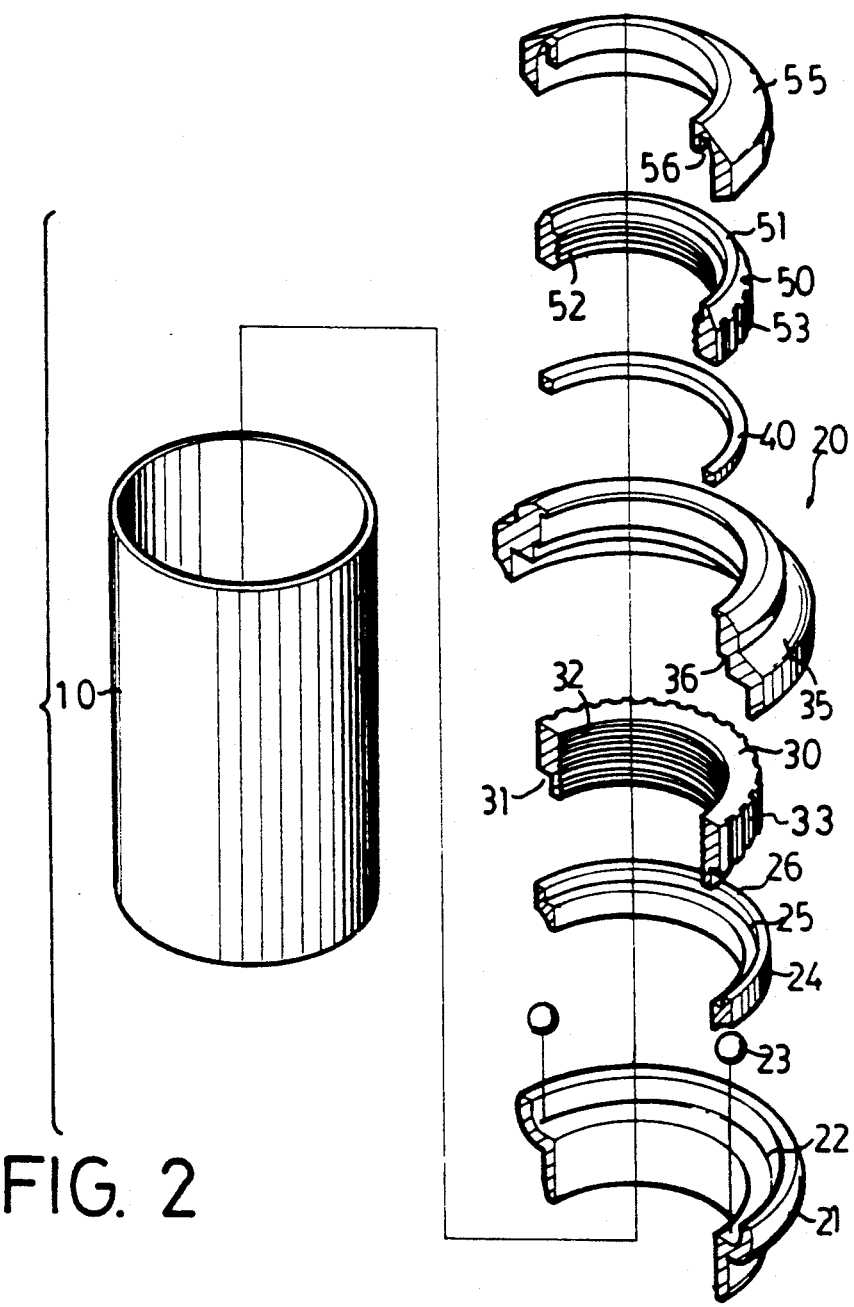
FIG. 2 is an exploded view of a journal for a head tube in accordance with the present invention.
Figure 3:
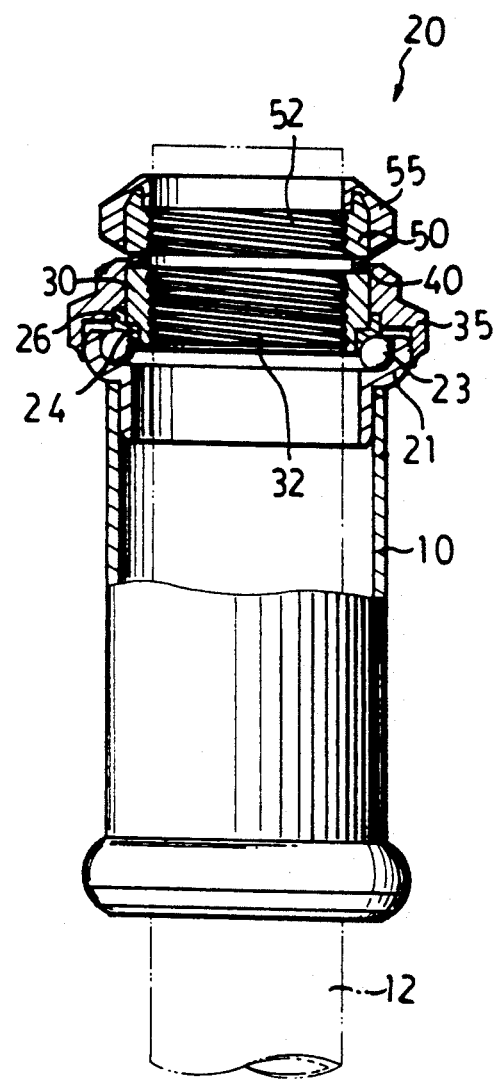
FIG. 3 is a partial cross sectional view of the journal.

Referring next to FIGS. 2 and 3, the journal 20 in accordance with the present invention comprises a lower cap 21 fitted in the upper end portion of the head tube 10 and having an annular recess 22 formed therein, a bearing or a plurality of balls 23 disposed in the annular recess 22 of the lower cap 21, a guide rail 24 engaged on the bearing 23, an upper cap 30 provided above the guide rail 24 and threadedly engaged on the upper portion of the front fork 12 so that the front fork 12 is rotatable relative to the head tube 10, a gasket 40 disposed upon the upper cap 30, and a compression nut 50 provided upon the gasket 40 and threadedly engaged on the upper portion of the front fork 12. Since the bearing or balls 23 are slidingly engaged between the lower cap 21 and the guide rail 24, only the lower cap 21 and the guide rail 24 are required to be heat treated so that they have greater hardness. The upper cap 30 need not to be heat treated. The guide rail 24 is rotatable relative to the lower cap 21.

An annular flange 26 extends upward from the guide rail 24 so that a shoulder 25 is formed in the upper portion of the guide rail 24. The upper cap 30 has a shoulder 31 formed in the lower portion thereof for engagement with the shoulder 25 of the guide rail 24. The upper cap 30 has an inner thread 32 formed in the inner peripheral surface thereof and has a plurality of ribs 33 formed on the outer peripheral surface thereof. A covering 35 which is made of plastic materials is formed on the outer peripheral portion of the upper cap 30 and is formed by such as molding processes. The material of the covering 35 fills in the gaps formed among the ribs 33 of the upper cap 30 so that the covering 35 and the upper cap 30 can be integrally formed together. An annular depression 36 is formed in the middle and inner portion of the covering 35. The annular flange 26 of the guide rail 24 is engaged in the annular depression 36 of the covering 35.

An annular flange 51 is formed on the upper portion of the nut 50 which has an inner thread 52 formed therein and has a plurality of ribs 53 formed on the outer peripheral surface thereof. The inner threads 32, 52 of the upper cap 30 and of the compression nut 50 are threadedly engaged with the upper portion of the front fork 12, and the compression nut 50 is provided for compressing the journal 20 in place. A casing 55 is formed on the compression nut 50 and the material thereof is filled in the gaps formed among the ribs 53 of the compression nut 50 so that the casing 55 and the compression nut 50 can be integrally formed together. The casing 55 has an annular cavity 56 formed therein for receiving the annular flange 51 of the compression nut 50.

Since the covering 35 and the casing 55 are formed by molding processes, the outer peripheral surfaces of the covering 35 and of the casing 55 can be made very smooth and can be formed with any suitable desired outer appearance. Accordingly, the outer peripheral surfaces of the upper casing 30 and of the nut 50 need not to be finished.

Although this invention has been described with a certain degree of particularlarity, it is to be understood that the present disclosure has been made by way of example only and that numerous changes in the detailed construction and the combination and arrangement of parts may be resorted to without departing from the spirit and scope of the invention as hereinafter claimed.

I claim:

1. A journal comprising a first cap engaged on an end portion of a head tube of a bicycle, said bicycle including a front fork having an upper portion rotatably engaged in said head tube, said first cap having an annular recess formed therein, a bearing means engaged in said annular recess of said first cap, a second cap threadedly engaged on said upper portion of said front fork and engaged on said bearing means so that said second cap and said front fork are rotatable relative to said first cap and said head tube, a guide rail having a first shoulder formed thereon, said second cap having a second shoulder formed in a lower portion thereof and engaged with said first shoulder of said guide rail so that said guide rail and said second cap are engaged with each other, said guide rail being engaged on said bearing means so that said guide rail is rotatable relative to said first cap, and a compression nut threadedly engaged on said upper portion of said front fork and engaged above said second cap so that said second cap is stably retained in place.

2. A journal according to claim 1, wherein said second cap has a plurality of ribs formed on an outer peripheral surface thereof, a covering is formed on said outer peripheral surface of said second cap, said covering has a material filled among said ribs so that said covering can be formed integral with said second cap.

3. A journal according to claim 2, wherein said guide rail has an annular flange formed on an upper portion thereof, said covering has an annular depression formed in a lower portion thereof for receiving said annular flange of said guide rail so that said second cap and said guide rail and said covering can be integrally formed together.

4. A journal comprising a first cap engaged on an end portion of a head tube of a bicycle, said bicycle including a front fork having an upper portion rotatably engaged in said head tube, said first cap having an annular recess formed therein, a bearing means engaged in said annular recess of said first cap, a second cap threadedly engaged on said upper portion of said front fork and engaged on said bearing means so that said second cap and said front fork are rotatable relative to said first cap and said head tube, and a compression nut threadedly engaged on said upper portion of said front fork and engaged above said second cap so that said second cap can be stably retained in place, said compression nut having a plurality of ribs formed on an outer peripheral surface thereof, a casing formed on said outer peripheral surface of said compression nut, said casing having a material filled among said ribs so that said casing is formed integral with said compression nut.

5. A journal according to claim 4, wherein said said casing has an annular cavity formed in a lower portion thereof for receiving an upper peripheral edge of said compression nut so that said compression nut and said casing can be integrally formed together.

* * * * *